US010698691B2

(12) United States Patent
Havlir

(10) Patent No.: US 10,698,691 B2
(45) Date of Patent: Jun. 30, 2020

(54) METHOD AND DEVICE FOR DETERMINING BRANCH PREDICTION HISTORY FOR BRANCH PREDICTION BY PARTIALLY COMBINING SHIFTED BRANCH PREDICTION HISTORY WITH BRANCH SIGNATURE

(71) Applicant: Advanced Micro Devices, Inc., Sunnyvale, CA (US)

(72) Inventor: Steven R. Havlir, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 304 days.

(21) Appl. No.: 15/252,168

(22) Filed: Aug. 30, 2016

(65) Prior Publication Data

US 2018/0060074 A1 Mar. 1, 2018

(51) Int. Cl.
*G06F 9/38* (2018.01)
*G06F 9/30* (2018.01)

(52) U.S. Cl.
CPC ........ *G06F 9/3806* (2013.01); *G06F 9/30058* (2013.01); *G06F 9/3842* (2013.01); *G06F 9/3848* (2013.01)

(58) Field of Classification Search
CPC .................................................. G06F 9/3842
See application file for complete search history.

(56) References Cited

U.S. PATENT DOCUMENTS

| 6,721,877 | B1 | 4/2004 | Chen et al. |
| 7,000,096 | B1 | 2/2006 | Sinharoy |
| 9,921,846 | B2 * | 3/2018 | Heil ..................... G06F 9/3844 |
| 2007/0150712 | A1 | 6/2007 | Ali et al. |
| 2008/0256347 | A1 | 10/2008 | Eickemeyer et al. |
| 2009/0125707 | A1 | 5/2009 | Olson et al. |
| 2009/0164766 | A1 | 6/2009 | Suggs et al. |
| 2009/0198984 | A1 | 8/2009 | Loschke et al. |
| 2015/0032997 | A1 * | 1/2015 | Eickemeyer ........ G06F 9/30058 712/206 |
| 2015/0309794 | A1 * | 10/2015 | Wilson .................. G06F 9/3848 712/240 |
| 2015/0331691 | A1 | 11/2015 | Levitan et al. |

OTHER PUBLICATIONS

Wikipedia, the Free Encyclopedia, "Branch predictor", available at: https://en.wikipedia.org/wiki/Branch_predictor, 2016 (Retrieved Aug. 29, 2016).

* cited by examiner

*Primary Examiner* — Jacob Petranek
(74) *Attorney, Agent, or Firm* — Volpe and Koenig, P.C.

(57) ABSTRACT

Disclosed are a method and a processing device directed to determining global branch history for branch prediction. The method includes shifting first bits of a branch signature into a current global branch history and performing a bitwise exclusive-or (XOR) function on second bits of the branch signature and shifted bits of the current global branch history. In this way, the current global branch history is updated. The processing device implements the method using a shift logic configured to store and shift bits representing a current global branch history, a register configured to store the current global branch history, decision circuitry configured to determine whether or not a branch is taken, and XOR gates.

18 Claims, 6 Drawing Sheets

METHOD AND DEVICE FOR DETERMINING BRANCH PREDICTION HISTORY FOR BRANCH PREDICTION BY PARTIALLY COMBINING SHIFTED BRANCH PREDICTION HISTORY WITH BRANCH SIGNATURE

BACKGROUND

In computer architecture, a branch predictor is a digital circuit that tries to guess which way a branch, such as an if-then-else structure in a program or code, will go before this is known for sure. A branch predictor implements a method of branch prediction. Branch prediction improves the flow in an instruction pipeline and plays a role in achieving high effective performance in many microprocessor architectures.

Branch prediction is based on branch history, that is, a record of how often a given branch is taken and not taken. In a global branch history, the branch histories of multiple branches are stored in one set of bits.

FIG. 2 shows a traditional type of processing device and method used to update a global branch history. Circuitry determines whether or not a branch has been found (step 225). When a branch has not been found, a current global history is unchanged (step 220). When a branch is found, the current global branch history is shifted by one bit (step 215; shown as a left shift) and the oldest history bit (bit 3) is lost. The rightmost bit in the current global branch history is replaced by a bit indicating whether or not the branch has been taken (step 230)—for example, a 0 for not taken and a 1 for taken. In this manner, the current global branch history is updated. The current branch history is used in a branch predictor to predict whether a branch will be taken or not taken in the future.

BRIEF DESCRIPTION OF THE DRAWINGS

A more detailed understanding may be had from the following description, given by way of example in conjunction with the accompanying drawings wherein.

DETAILED DESCRIPTION

Figure 1:
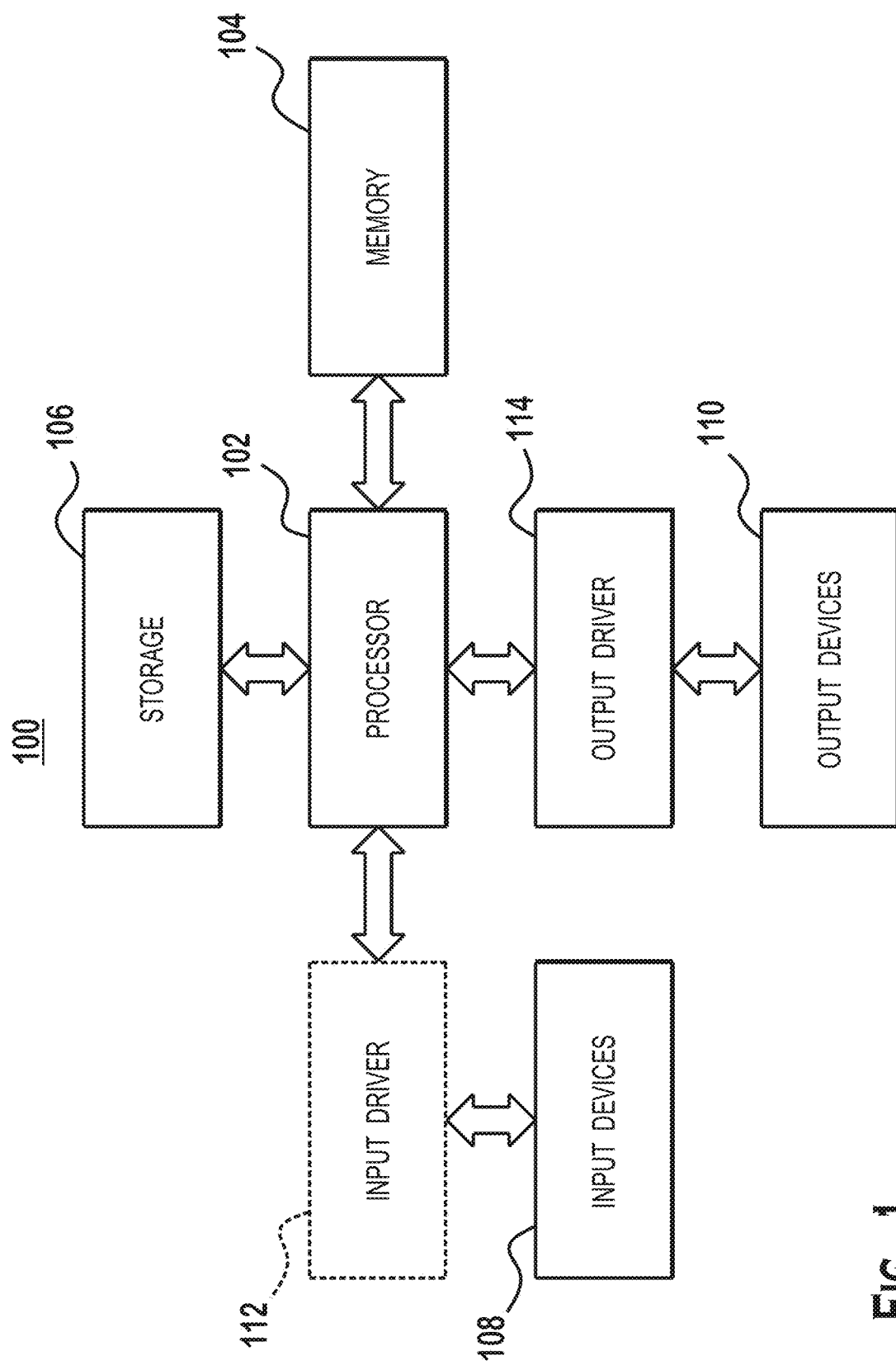
FIG. 1 is a block diagram of an example device in which one or more disclosed aspects may be implemented.
Figure 2:
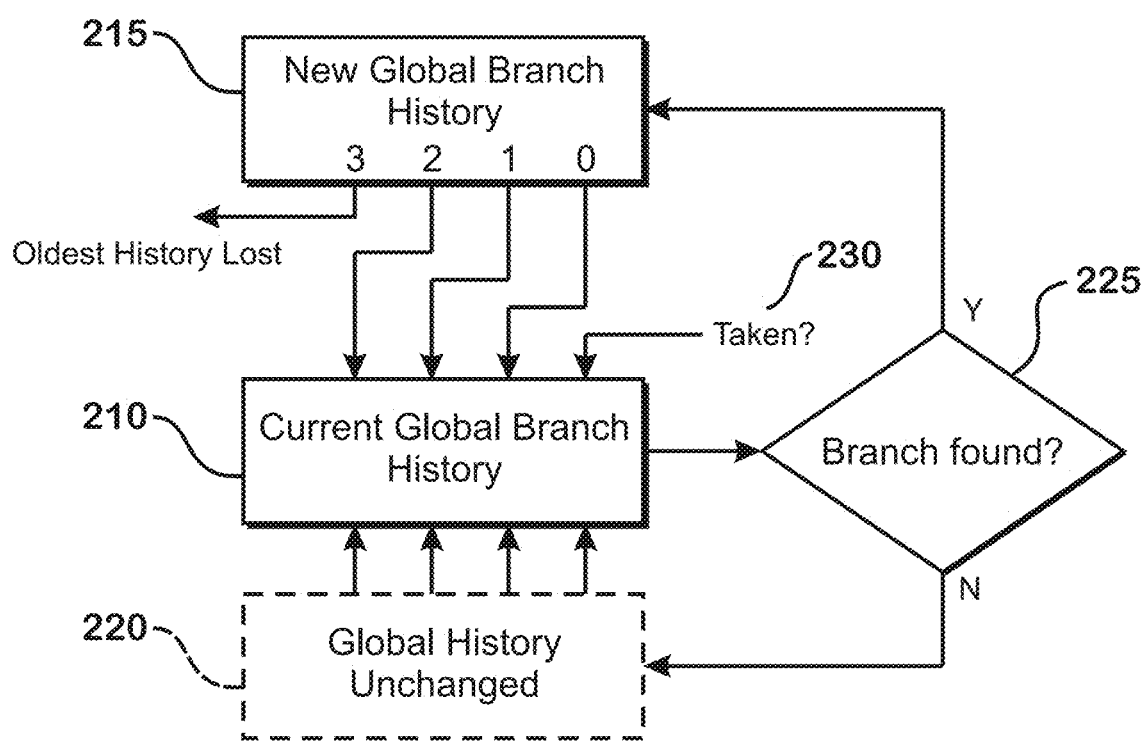
FIG. 2 shows a processing device configured to update a global branch history.

In contrast to traditional global branch history methods and devices, such as previously described, the disclosed method and device improves timing and avoids loss of previous branch predictor training when a new branch is discovered. The disclosed method and device also provide benefit of being able to differentiate between identical taken/not taken (T/NT) patterns at different code locations. If the computer code being executed contains discovered NT branches, the disclosed method and device is able to track longer sequences than traditional global history updating methods and devices.

The method includes shifting first bits of a branch signature into a current global branch history and performing a bitwise exclusive-or (XOR) function on second bits of the branch signature and shifted bits of the current global branch history. The second bits are distinct from the first bits. The branch signature includes bits that identify a particular branch whose branch history is being updated. The shifting includes discarding one or more of the oldest bits in the current global branch history. The shifting and the performing of the bitwise XOR function are executed when a branch identified by the branch signature is taken. The current global branch history is not changed when a branch identified by the branch signature is not taken.

In an implementation, the method also includes shifting one or more newest bits in the current global branch history by a first number of places, shifting one or more oldest bits in the current global branch history by a second number of places different from the first number of places, and performing a bitwise XOR function between bits shifted by the second number of places and newer bits in the current global branch history. These parts of the method are executed when a branch identified by the branch signature is taken, and the current global branch history does not change when a branch identified by the branch signature is not taken. For example, the second number of places is less than the first number of places (e.g., the first number of places is three and the second number of places is one).

In an implementation, the method is implemented such that the updated current global branch history is included in a first level of a two-level adaptive predictor.

In an implementation, the processing device, configured to determine and update global branch history for branch prediction, includes shift logic configured to shift bits representing a current global branch history, a register configured to store the current global branch history, decision circuitry configured to determine whether or not a branch is taken, and a first plurality of exclusive-or (XOR) gates.

In an implementation, the determining and updating of global branch history include the shift logic shifting bits representing a current global branch history and storing one or more of the shifted bits in the register, the register receiving and storing first bits of a branch signature, the first plurality of XOR gates performing a bitwise XOR function on second bits of the branch signature and shifted bits of the current global branch history, and storing a result of the bitwise XOR function in the register.

In an implementation, the processing device is configured to determine and update global branch history when the decision circuitry determines that a branch identified by the branch signature has been taken. In an implementation, the processing device is configured to not change the current global branch history when the decision circuitry determines that a branch identified by the branch signature is not taken.

In an implementation the processing device is further configured to execute compression of branch history information and branch signature information. In this implementation the processing device is configured to shift one or more of the newest bits in the current global branch history by a first number of places, and shift one or more of the oldest bits in the current global branch history by a second number of places different from the first number of places. The processing device further includes a second plurality of XOR gates configured to perform a bitwise XOR function between bits shifted by the second number of places and newer bits in the current global branch history. This implementation of the processing device is also configured to execute compression of branch history information and branch signature information when the decision circuitry determines that a branch identified by the branch signature has been taken. The processing device does not change the current global branch history when the decision circuitry determines that a branch identified by the branch signature is not taken.

In a particular implementation of the processing device configured to execute compression, the second number of places may be less than the first number of places. The first number of places may be three and the second number of places may be one. Another particular implementation may include multiple levels of compression. As one example, newer bits in the current global branch history may be shifted by three places, older bits by two places, and still older bits by one place. For effective compression, the amount of shifting tends to decrease as the historical age of the bit increases.

The processing device includes a two-level adaptive predictor apparatus configured to receive the updated current global branch history in a first level.

FIG. 1 is a block diagram of an example device 100 in which one or more disclosed embodiments are implemented. Examples of the device 100 include a computer, a gaming device, a handheld device, a set-top box, a television, a mobile phone, or a tablet computer. The device 100 includes a processor 102, a memory 104, a storage 106, one or more input devices 108, and one or more output devices 110. Optionally, the device 100 includes an input driver 112 and an output driver 114. It is understood that the device 100 may include additional components not shown in FIG. 1.

The processor 102 includes a central processing unit (CPU), a graphics processing unit (GPU), a CPU and GPU located on the same die, or one or more processor cores, wherein each processor core may be a CPU or a GPU. The memory 104 is located on the same die as the processor 102, or the memory 104 is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 3:
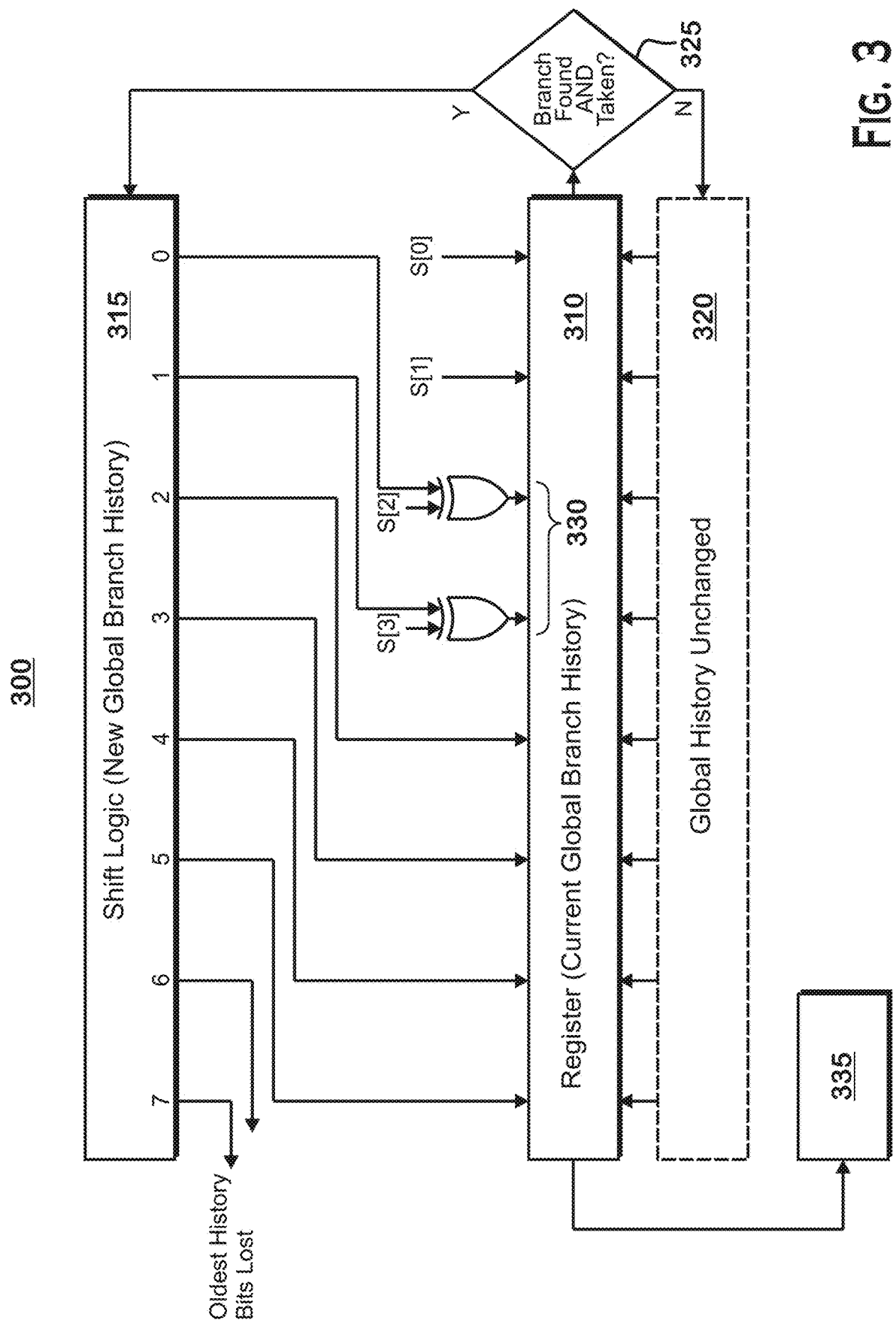
FIG. 3 shows another processing device configured to update a global branch history.

FIG. 3 shows an example implementation of an electronic processing device 300 configured to determine and update global branch history for branch prediction. Specifics of electronic processing device 300 such as exact numbers of bits are not to be considered as limiting.

A current global branch history is stored as a bit sequence in a register 310. In FIG. 3, the current global branch history is shown as having eight bits, but this number is not to be considered limiting. When a branch is found, a determination is made by decision circuitry 325 whether the branch has been taken or not taken. If the branch has not been taken, the current global history is not changed 320 and is re-stored in register 310. If the branch has been taken, the current global branch history is updated, as in the following example, which is not to be considered limiting.

The updating begins with shift logic 315 shifting bits representing a current global branch history, and storing the shifted bits in register 310. As shown in FIG. 3, for example, bits 0 through 5 are shifted to the left by two places. In this process, older bits 6 and 7 of this branch history are discarded. One or more of the shifted bits, such as bits 2-5, are stored directly into register 310. Register 310 receives and stores first bits S[1] and S[0] of a branch signature, which identifies a particular branch whose branch history is being updated. As non-limiting examples, a branch signature could be as simple as the least significant bits of a linear address, or it could be as complicated as (a first linear address portion) XOR (a second linear address portion) XOR (bits representing branch type) XOR (bits representing other attributes of the branch). If a 4 bit branch signature is needed, for example, the 12 least significant bits of a linear address (LINAD) can be XOR'ed with four bits representing branch type, as follows:

LINAD [11:8] XOR
LINAD [7:4] XOR
LINAD [3:0] XOR
TYPE [3:0].

Updating of current global branch history continues with a plurality of XOR gates 330 performing a bitwise XOR function on second bits of the branch signature—such as S[3] and S[2]—and shifted bits of the current global branch history, such as bits 0 and 1. Bits resulting from this performance of bitwise XOR function are stored in register 310, thereby updating the current global branch history stored in register 310.

Global branch history stored in register 310 is passed to a branch predictor 335, an electronic circuit that predicts a likelihood that a branch will be taken, using the current branch history. In an implementation, the branch predictor 335 is a two-level adaptive predictor apparatus that is configured to receive updated current global branch history in its first level. Alternative implementations may include other types of branch predictors.

Figure 4:
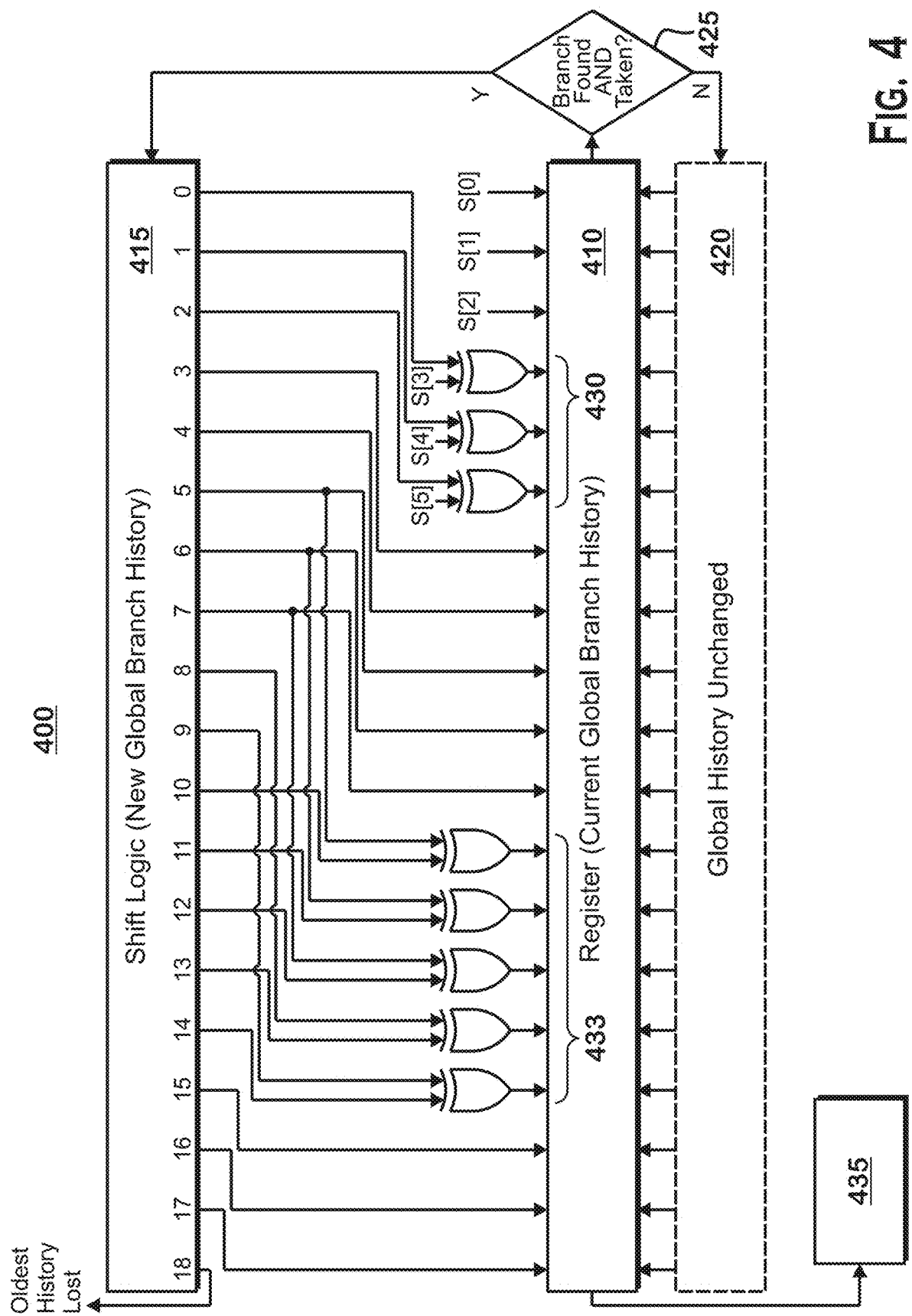
FIG. 4 shows another processing device configured to update a global branch history.

FIG. 4 shows an alternative example implementation of an electronic processing device 400 configured to determine and update global branch history for branch prediction. Specifics of electronic processing device 400 such as exact numbers of bits are not to be considered as limiting. The implementation of FIG. 4 includes compression of branch history information and branch signature information through variable shifting and additional XOR functions.

Similar to the example of FIG. 3, a current global branch history is stored as a bit sequence in a register 410. In FIG. 4, the current global branch history is shown as having 19 bits, but this number is not to be considered limiting.

When a branch is found, a determination is made by decision circuitry 425 whether the branch has been taken or not taken. If the branch has not been taken, the current global history is not changed 420 and is re-stored in register 410. If the branch has been taken, the current global branch history is updated, as in the following example, which is not to be considered limiting.

In the implementation shown in FIG. 4, the updating begins with shift logic 415 shifting bits representing a current global branch history, and storing the shifted bits in register 410. In contrast to FIG. 3, however, one or more of the newest bits of the current global branch history are shifted by a first number of places, and one or more of the oldest bits are shifted by a second number of places, the first number of places and the second number of places being not equal. In particular, the second number of places is less than the first number of places. As shown in FIG. 4, bits 0 through 7 are shifted to the left by three places, while bits 10 through 16 are shifted to the left by one place. One or more of the shifted bits are stored directly into register 410. In the example of FIG. 4, these bits are 3-7, 15, 16, and 17. In this process, oldest bit 18 of this branch history is discarded.

Similar to FIG. 3, register 410 receives and stores first bits S[2], S[1] and S[0] of a branch signature. Similar to FIG. 3, updating of current global branch history continues with a first plurality of XOR gates 430 performing a bitwise XOR function on second bits of the branch signature—S[5], S[4] and S[3] in the example of FIG. 4—and shifted bits of the current global branch history, bits 0, 1, and 2 in the example of FIG. 4. Bits resulting from this performance of the bitwise XOR function are stored in register 410 as part of the updated current branch history.

In contrast to FIG. 3, the device of FIG. 4 performs a compression using a second plurality of XOR gates 433. The XOR gates 433 are configured to perform a bitwise XOR function between current global branch history bits shifted by the second number of places and newer bits of the current global branch history. Bits resulting from this performance of bitwise XOR function are stored in register 410 to complete updating of current global branch history. In the particular example of FIG. 4, the following XOR functions are performed: 10 XOR 5, 11 XOR 6, 12 XOR 7, 13 XOR 8, and 14 XOR 9.

In an implementation, global branch history stored in register 410 is passed to a branch predictor 435 that predicts a likelihood that a branch will be taken using the current global branch history. In an implementation, the branch predictor 435 is a two-level adaptive predictor apparatus that is configured to receive updated current global branch history in its first level. Alternative implementations may include other types of branch predictors.

Figure 5:
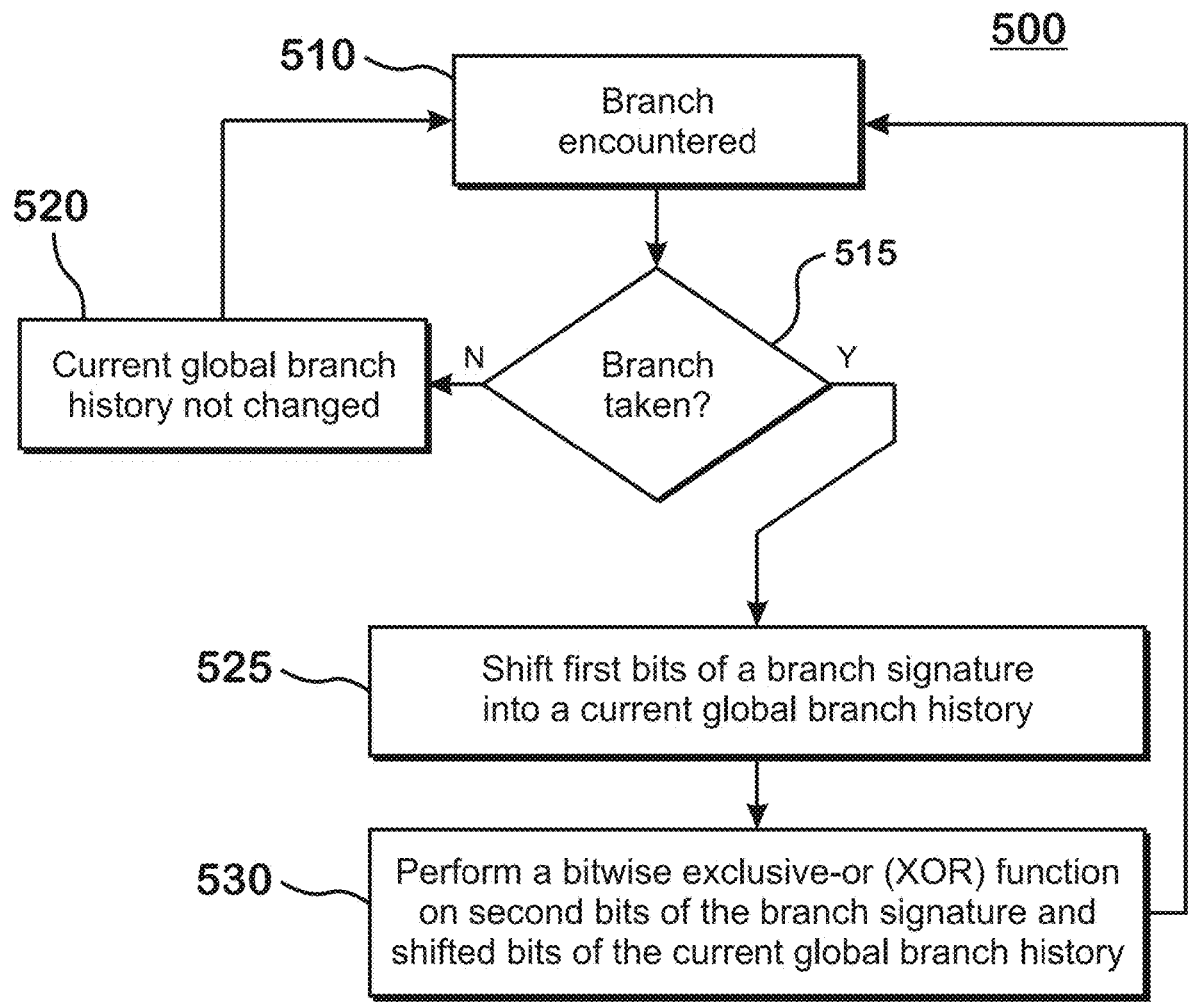
FIG. 5 shows a method for determining and updating a global branch history.

FIG. 5 shows a method 500 of determining global branch history for branch prediction. The exact order of steps shown is not necessarily to be construed as limiting. During execution of code, a branch is encountered (step 510). A determination is made whether or not this branch is taken (step 515). When the branch is not taken, a current global branch history is not changed (step 520) and the method returns to wait for a next encountered branch (step 510).

When the branch is taken, the current global branch history is updated. Updating begins by shifting first bits of a branch signature into a current global branch history (step 525). The shifting includes discarding one or more of the oldest bits in the current global branch history. A bit-wise XOR function is performed on second bits of the branch signature and shifted bits of the current global branch history (step 530). The current global branch history is now updated and stored in a register, as described above. The method returns to wait for a next encountered branch (step 510).

Figure 6:
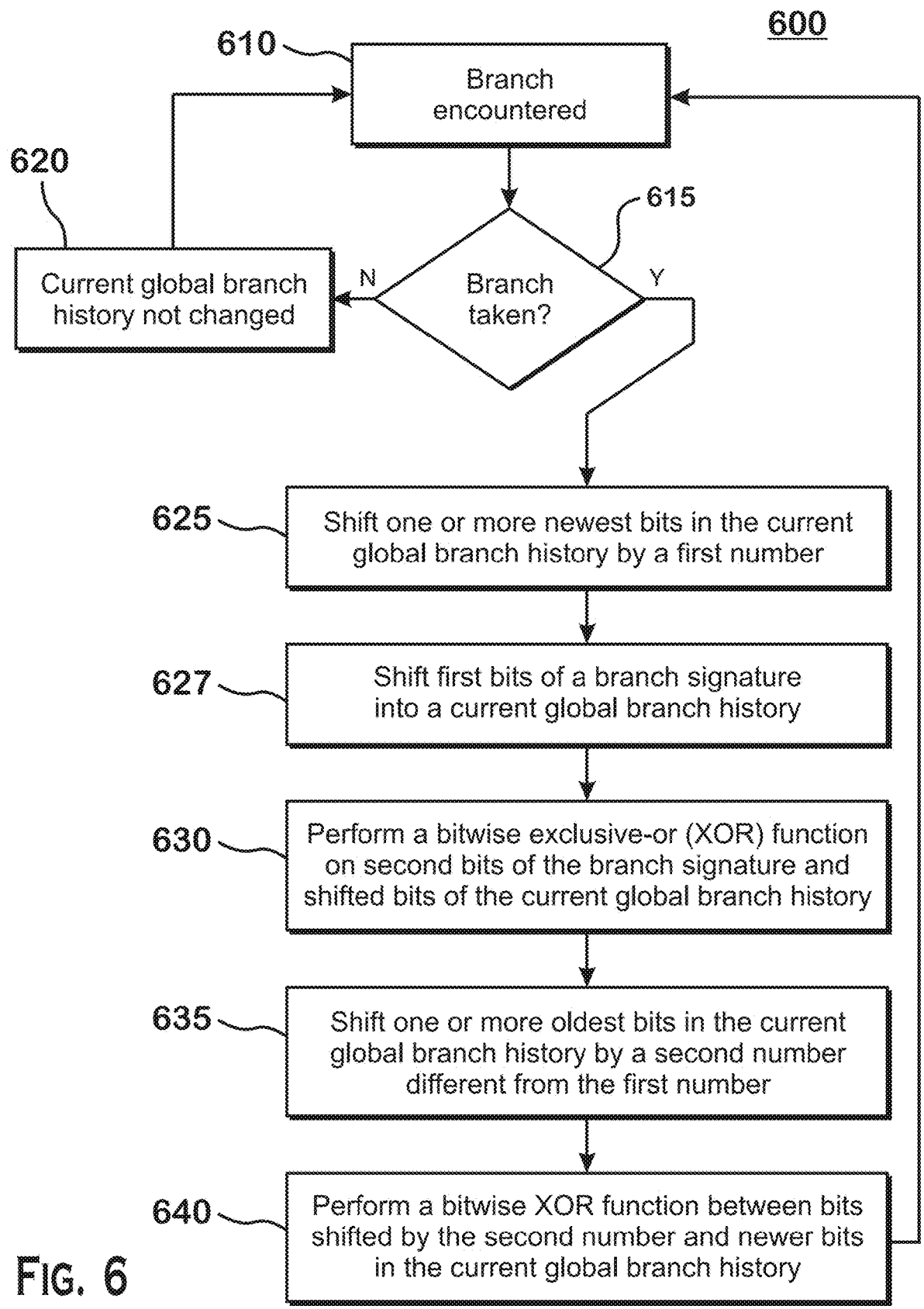
FIG. 6 shows another method for determining and updating a global branch history.

FIG. 6 shows another implementation 600 of a method of determining global branch history for branch prediction. The exact order of steps shown is not necessarily to be construed as limiting. In addition to the method shown in FIG. 5, the implementation shown in FIG. 6 includes compression of branch history information and branch signature information through variable shifting and additional XOR functions. As in FIG. 5, a branch is encountered (step 610) and a determination is made (step 615) whether or not this branch has been taken. If it has not been taken then, as in FIG. 5, the current global branch history is not changed (step 620) and the method returns to wait for the next branch to be encountered (step 610).

When the branch is taken, one or more the newest bits in the current global branch history are shifted by a first number of places (step 625). First bits of a branch signature are shifted into the current global branch history (step 627). An exclusive XOR function is performed on second bits of the branch signature and bits of the current global branch history shifted by the first number of places (step 630).

One or more of the oldest bits in the current global branch history are shifted by a second number of places different from the first number of places (step 635). In a particular implementation, the second number of places is less than the first number of places. As an example, the first number of places is three and the second number of places is one. As a result of the two shifts, one or more of the oldest bits in current global branch history are discarded.

A bitwise XOR function is performed between bits of the current global branch history shifted by the second number of places and newer bits in the current global branch history (step 640). One or more of the shifted bits of the current global branch history become bits of the updated branch history without further processing.

The current global branch history is now updated. In an implementation, the updated global branch history is stored in a register, as described above. The method returns to wait for a next encountered branch (step 610).

It should be understood that many variations are possible based on the disclosure herein. Although features and elements are described above in particular combinations, each feature or element can be used alone without the other features and elements or in various combinations with or without other features and elements.

The methods provided are implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of determining global branch history for branch prediction, the method comprising:
   shifting first bits of a branch signature into lowest order bits of a register storing current global branch history, the first bits of the branch signature shifted into the current global branch history being unmodified by the current global branch history;
   performing a bitwise exclusive-or (XOR) function on second bits of the branch signature and bits of the current global branch history to generate third bits for storage into the register storing the current global branch history, to update the current global branch history, wherein the second bits are distinct from and higher order than the first bits, and wherein the third bits are stored at bit locations of the register that are higher order than the lowest order bits of the register into which the unmodified first bits of the branch signature are shifted;
   performing a bitwise XOR function on different combinations of bits of the current global branch history to obtain fourth bits and storing the fourth bits at bit locations of the register that are higher order than the bit locations in which the third bits are stored, wherein the different combinations of bits for which the XOR function is performed comprise a first set of bits of the current global branch history and a second, higher order set of bits of the current global branch history; and
   storing bits of the current global branch history, that are higher order than the lowest order bits of the current global branch history, into the global branch history register at a location that is higher order than the third bits for storing into the global branch history register and lower order than the fourth bits for storage into the global branch history register, the bits of the current global branch history being higher order than the lowest order bits of the global branch history and lower order than each of the bits of the different combinations of bits from which the fourth bits are obtained.

2. The method of claim 1, wherein the branch signature comprises bits that identify a particular branch whose branch history is being updated.

3. The method of claim 1, further comprising discarding one or more oldest bits in the current global branch history.

4. The method of claim 1, wherein the shifting and the performing of the bitwise XOR function are executed when a branch identified by the branch signature is taken.

5. The method of claim 1, wherein the current global branch history is not changed when a branch identified by the branch signature is not taken.

6. The method of claim 1, further comprising compression of branch history information and branch signature information, the compression comprising:
   shifting one or more newest bits in the current global branch history by a first number of places;
   shifting one or more oldest bits in the current global branch history by a second number of places different from the first number of places; and
   performing a bitwise XOR function between bits shifted by the second number of places and newer bits in the current global branch history.

7. The method of claim 6, executed when a branch identified by the branch signature is taken.

8. The method of claim 6, wherein the current global branch history is not changed when a branch identified by the branch signature is not taken.

9. The method of claim 6, wherein the second number of places is less than the first number of places.

10. The method of claim 1, wherein the updated current global branch history is included in a first level of a two-level adaptive predictor.

11. A processing device configured to determine and update global branch history for branch prediction, the processing device comprising:
    shift logic configured to shift bits representing a current global branch history;
    a register configured to store the current global branch history;
    decision circuitry configured to determine whether or not a branch is taken; and
    a first plurality of exclusive-or (XOR) gates and a second plurality of XOR gates;
    wherein the determining and updating of global branch history comprises:
      the shift logic shifting bits representing a current global branch history and storing one or more of the shifted bits in the register;
      the register receiving and storing first bits of a branch signature into lowest order bits of the register, the branch signature comprising bits that identify a particular branch whose branch history is being updated, the first bits of the branch signature being unmodified by the current global branch history;
      the first plurality of XOR gates performing a bitwise XOR function on second bits of the branch signature and bits of the current global branch history to generate third bits for storage into the register storing the current global branch history, to update the current global branch history, wherein the second bits are distinct from and higher order than the first bits;
      storing the third bits into the register generated by the first plurality of XOR gates into the register to update the current global branch history, wherein the third bits are stored at bit locations of the register that are higher order than the lowest order bits of the register into which the unmodified first bits of the branch signature are shifted;
      the second plurality of XOR gates performing a bitwise XOR function on different combinations of bits of the current global branch history to obtain fourth bits for storage into the register, wherein the different combinations of bits for which the XOR function is performed comprise a first set of bits of the current global branch history and a second, higher order set of bits of the current global branch history;
      storing the fourth bits at bit locations of the register that are higher order than the bit locations in which the third bits are stored; and
      storing bits of the current global branch history, that are higher order than the lowest order bits of the current global branch history, into the global branch history register at a location that is higher order than the third bits for storing into the global branch history register and lower order than the fourth bits for storage into the global branch history register, the bits of the current global branch history being higher order than the lowest order bits of the global branch history and lower order than each of the bits of the different combinations of bits from which the fourth bits are obtained.

12. The processing device of claim 11, further configured to determine and update global branch history for branch prediction when the decision circuitry determines that a branch identified by the branch signature has been taken.

13. The processing device of claim 11, further configured to not change the current global branch history when the decision circuitry determines that a branch identified by the branch signature is not taken.

14. The processing device of claim 11, further configured to execute compression of branch history information and branch signature information, wherein:
the shift logic is configured to shift one or more newest bits in the current global branch history by a first number of places;
the shift logic is configured to shift one or more oldest bits in the current global branch history by a second number of places different from the first number of places; and
the processing device further comprises a second plurality of XOR gates configured to perform a bitwise XOR function between bits shifted by the second number of places and newer bits in the current global branch history.

15. The processing device of claim 14, further configured to execute compression of branch history information and branch signature information when the decision circuitry determines that a branch identified by the branch signature has been taken.

16. The processing device of claim 14, further configured to not change the current global branch history when the decision circuitry determines that a branch identified by the branch signature is not taken.

17. The processing device of claim 14, wherein the second number of places is less than the first number of places.

18. The processing device of claim 14, further comprising a two-level adaptive predictor apparatus configured to receive the updated current global branch history in a first level.

\* \* \* \* \*